United States Patent
Fu et al.

(10) Patent No.: US 10,869,295 B2
(45) Date of Patent: Dec. 15, 2020

(54) METHOD AND APPARATUS FOR RECEIVING PAGING INFORMATION

(71) Applicant: Samsung Electronics Co., Ltd., Suwon-si (KR)

(72) Inventors: Jingxing Fu, Beijing (CN); Bin Yu, Beijing (CN); Chen Qian, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/495,596

(22) PCT Filed: Mar. 22, 2018

(86) PCT No.: PCT/KR2018/003385
§ 371 (c)(1),
(2) Date: Sep. 19, 2019

(87) PCT Pub. No.: WO2018/174612
PCT Pub. Date: Sep. 27, 2018

(65) Prior Publication Data
US 2020/0022105 A1 Jan. 16, 2020

(30) Foreign Application Priority Data

Mar. 24, 2017 (CN) .......................... 2017 1 0184869
May 16, 2017 (CN) .......................... 2017 1 0344158

(51) Int. Cl.
*H04W 68/02* (2009.01)
*H04W 52/02* (2009.01)
(52) U.S. Cl.
CPC ....... *H04W 68/02* (2013.01); *H04W 52/0229* (2013.01)

(58) Field of Classification Search
CPC ....... H04W 4/40; H04W 4/70; H04W 68/005; H04W 68/02; H04W 68/025;
(Continued)

(56) References Cited

U.S. PATENT DOCUMENTS

2004/0029596 A1* 2/2004 Kim ...................... H04L 12/189
455/458
2007/0064652 A1* 3/2007 Xu ...................... H04W 72/005
370/331

(Continued)

FOREIGN PATENT DOCUMENTS

EP 3247153 A1 11/2017
WO 2016/114215 A1 7/2016

OTHER PUBLICATIONS

Extended European Search Report dated Jan. 8, 2020, issued in a counterpart European Application No. 18772264.0-1219/ 3583811.

(Continued)

*Primary Examiner* — Jean A Gelin
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present application provides a method and apparatus for receiving paging information, the method comprises: receiving paging indication information; determining whether one or more paging occasions have paging information required to be received by this UE, based on the paging indication information; receiving this paging infor- (Continued)

mation, when it is determined that one or more POs have paging information required to be received by this UE; ignoring this paging information, when it is determined that one or more POs do not have paging information required to be received by this UE. By doing this, a great number of work such as receiving, decoding and recognizing the paging information required to be received for other UEs is saved; reasonably configuring paging indication information can enable that the overhead for the processing work such as receiving paging indication information by the UE is far less than a great amount of overhead for processing the paging information for other UEs; thereby the efficiency for receiving the paging information is promoted, the system resources of the UE is saved, the power consumption of the UE is saved, and the duration of the UE is prolonged.

10 Claims, 4 Drawing Sheets

(58) Field of Classification Search
CPC ..... H04W 76/20; H04W 76/27; H04W 76/28; H04W 84/027; H04W 48/12; H04W 52/0229; H04W 52/02; H04W 52/0238; H04W 52/0245; H04W 42/042
See application file for complete search history.

(56) References Cited

U.S. PATENT DOCUMENTS

| | | | | |
|---|---|---|---|---|
| 2007/0064662 | A1* | 3/2007 | Bultan | H04W 52/0225 370/338 |
| 2010/0272004 | A1* | 10/2010 | Maeda | H04W 72/0466 370/312 |
| 2011/0136456 | A1* | 6/2011 | Deshpande | H04W 52/0261 455/226.1 |
| 2012/0002635 | A1* | 1/2012 | Chung | H04L 5/0053 370/329 |
| 2012/0122495 | A1 | 5/2012 | Weng et al. | |
| 2012/0188930 | A1* | 7/2012 | Mao | H04W 72/005 370/312 |
| 2013/0184013 | A1* | 7/2013 | Chao | H04W 68/025 455/458 |
| 2014/0086112 | A1* | 3/2014 | Stern-Berkowitz | H04L 1/1822 370/280 |
| 2014/0169251 | A1* | 6/2014 | Lee | H04W 52/0216 370/311 |
| 2015/0043355 | A1* | 2/2015 | Kim | H04L 1/1607 370/241 |
| 2015/0173039 | A1* | 6/2015 | Rune | H04W 52/0232 370/311 |
| 2015/0341898 | A1 | 11/2015 | Xu | |
| 2016/0014716 | A1 | 1/2016 | Tabet et al. | |
| 2016/0044578 | A1* | 2/2016 | Vajapeyam | H04W 76/28 370/252 |
| 2016/0044652 | A1* | 2/2016 | Xue | H04W 56/001 370/329 |
| 2016/0119970 | A1* | 4/2016 | Lee | H04W 24/08 370/328 |
| 2016/0269994 | A1* | 9/2016 | Pocha | H04W 4/70 |
| 2016/0270028 | A1 | 9/2016 | Lee et al. | |
| 2017/0006659 | A1 | 1/2017 | Jha et al. | |
| 2017/0273078 | A1* | 9/2017 | Rico Alvarino | H04W 68/00 |
| 2017/0367058 | A1* | 12/2017 | Pelletier | H04W 56/0045 |
| 2018/0007733 | A1 | 1/2018 | Mochizuki et al. | |
| 2019/0082490 | A1* | 3/2019 | Zhang | H04W 48/08 |

OTHER PUBLICATIONS

Sharetechnote: "Paging LTE", , Feb. 26, 2017 (Feb. 26, 2017), XP055652240, Retrieved from the Internet: URL:http://web.archive.org/web/20170226214352/https:// www.sharetechnote.com/html/Paging_LTE.html [retrieved on Dec. 12, 2019].

* cited by examiner

[Fig. 1]
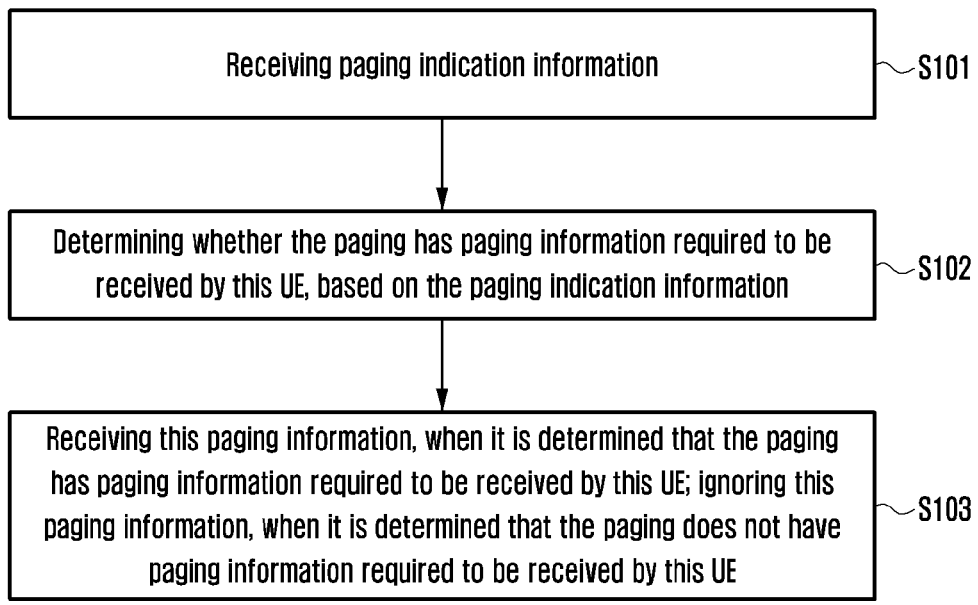
[Fig. 2]
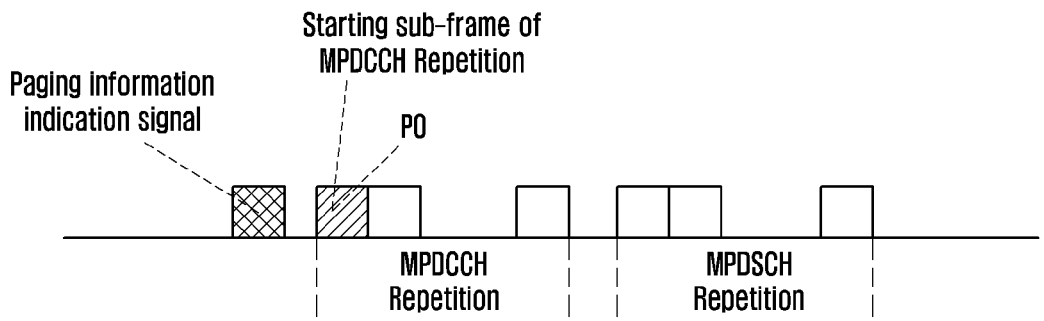
[Fig. 3]
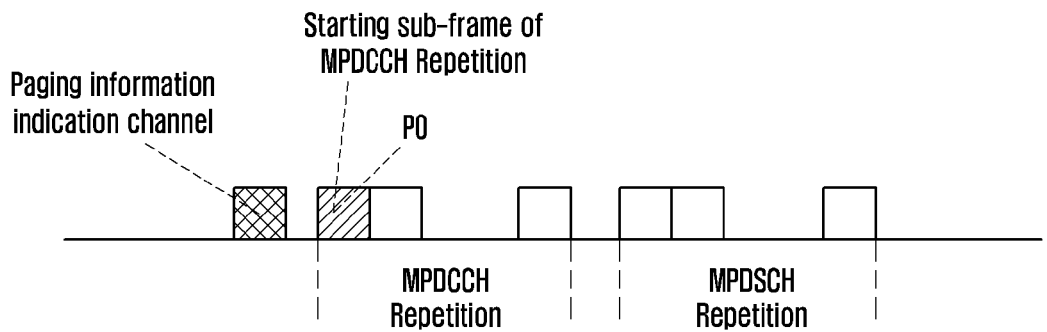

[Fig. 4]
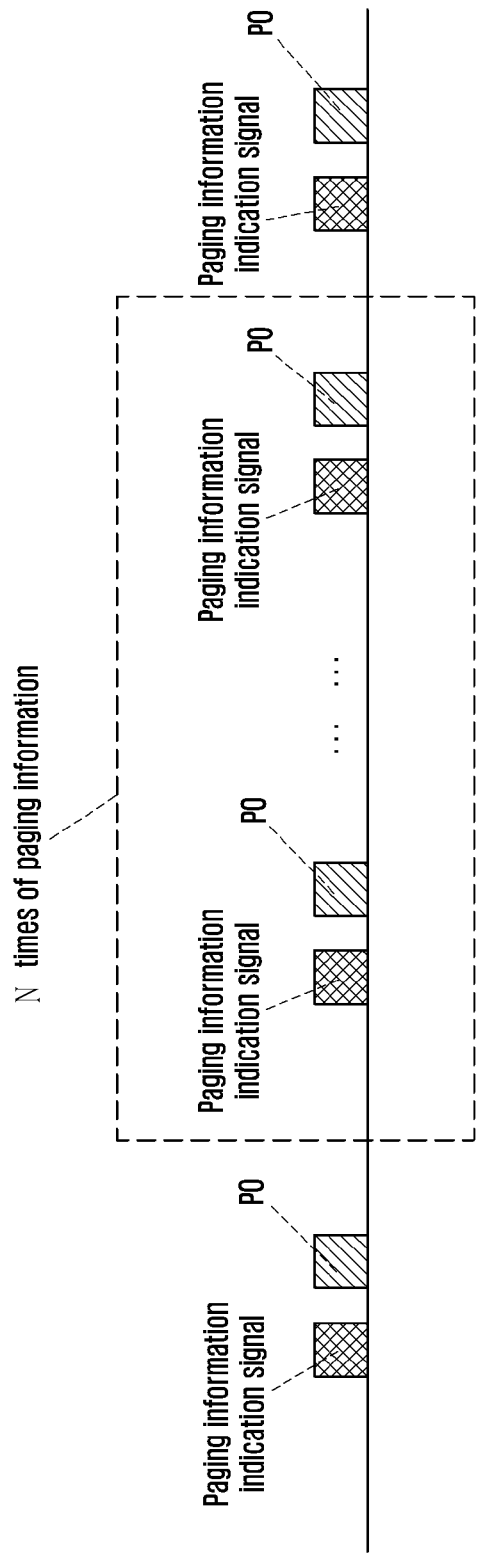

[Fig. 5]
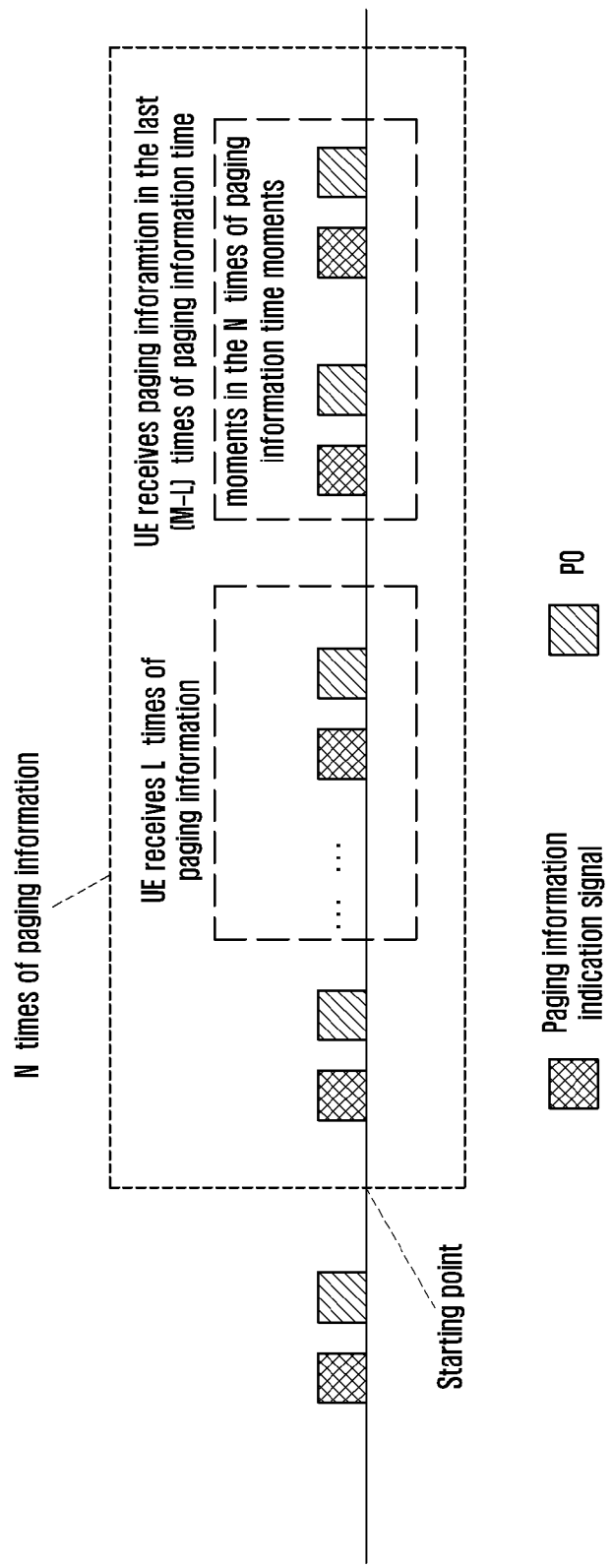

[Fig. 6]
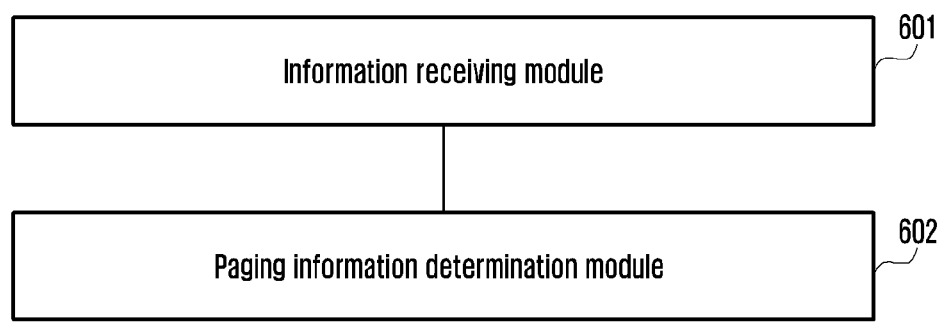

METHOD AND APPARATUS FOR RECEIVING PAGING INFORMATION

TECHNICAL FIELD

The present application relates to the technical field of communication technology, and in particular to a method and apparatus for receiving paging information.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Co-ordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In the current communication system, for example, in enhanced Machine Type Communication (eMTC) system and Narrowband-internet of Things (NB-IOT) system, under idle state, User Equipment (UE) usually receives paging information by discontinuous monitoring for saving electricity.

The current method for receiving paging information usually comprises: in the process of monitoring the paging, the UE acquires the subframe of Physical Downlink Control Channel (PDCCH) according to Paging Frame (PF) and Paging Occasion (PO), and then receives Downlink Control Information (DCI) transmitted by PDCCH; and receives paging information in Physical Downlink Shared Channel (PDSCH) according to the DCI. PO is the occasion for the UE to monitor the paging; the PO and PF is deduced by the Discontinuous Reception (DRX) period and number of time moments of paging in each radio frame indicated in the system information.

However, the inventor/inventors of the present invention notice/notices that, in the current communication system, for example in the eMTC system and NB-IOT system, the DCI and paging information in the paging is transmitted to one group of UEs or all the UEs repeatedly in round sequences by the common searching space. Each UE usually needs to receive a large number of DCI and paging information transmitted repeatedly, decodes the paging information for each received DCI and corresponding paging information; recognizes the decoded paging information, if it is recognized that the paging information is transmitted for this UE, this UE operates according to this paging information; if it is recognized that the paging information is not transmitted for this UE, then the paging information is ignored. Since the number of times of the repetition transmission for the DCI and paging information is larger, the UE will receive a great number of paging information for other UEs. A great number of system resources are wasted for processing work such as receiving, decoding and recognition for other UEs, and then a great number of powers are wasted. Accordingly, the duration of the UE is greatly influenced.

DISCLOSURE OF INVENTION

Technical Problem

For the defect of the current method, the present invention provides a method and apparatus for receiving paging information, so as to solve the problem that the prior art has a great number of paging information for other UEs and the powers are wasted. Therefore, the probability of receiving paging information for other UEs is reduced and the powers are saved.

Solution to Problem

According to one aspect of embodiments of the present invention, a method for receiving paging information is provided, comprises:

receiving paging indication information;

determining whether one or more POs have paging information required to be received by this User Equipment (UE), based on the paging indication information;

receiving this paging information, when it is determined that one or more POs have the paging information.

According to another aspect, the embodiment of the present invention provides an apparatus for receiving paging information, comprises: an information receiving module and a paging information determination module;

the information receiving module is configured to receive paging indication information; receiving this paging information, when it is determined that one or more POs have the paging information by the paging determination module.

The paging information determination module is configured to determine whether one or more POs have paging information required to be received by this User Equipment (UE), based on the paging indication information.

In the present invention, the UE receives paging indication information; determines whether one or more POs have a paging information required to be received by this UE, according to the paging indication information; when it is determined that one or more POs have a paging information required to be received by this UE, the UE receives this paging information; when it is determined that one or more POs have no paging information required to be received by this UE, the UE ignores this paging information. By doing this, a great number of processing work such as receiving, decoding and recognizing the paging information required to be received for other UEs is saved; reasonably configuring paging indication information can enable that the overhead for the processing work such as receiving paging indication information by the UE is far less than a great amount of overhead for processing the paging information for other UEs; thereby the efficiency for receiving the paging information is promoted, the system resources of the UE is saved, the power consumption of the UE is saved, and the duration of the UE is prolonged. Further, transmitting same paging indication information for one group of UEs can save the overhead for transmitting the paging indication information.

Moreover, in the embodiments of the present invention, according to whether the amplitude of the received paging information indication signal is greater than or equal to a corresponding amplitude threshold, whether one or more POs have paging information required to be received by this UE is determined. Or, according to whether the information indication of the paging information indication channel can be obtained by blind detection, whether one or more POs have the paging information required to be received by this UE is determined. When the amplitude is less than amplitude threshold or the information indication of the paging information indication channel cannot be blind detected, it is determined that one or more POs do not have the paging information required to be received by this UE, and the reception of the paging control information and paging information is directly abandoned. By doing this, a great number of work such as receiving, decoding and recognizing the paging information required to be received for other UEs is saved, the efficiency for receiving the paging information is promoted, the system resources of the UE is saved, the power consumption of the UE is saved, and the duration of the UE is prolonged.

Besides, in the embodiments of the present invention, according to the pre-acquired time-frequency location of the paging indication information, the paging indication information is received preciously. The number of times for attempting to receive paging indication information is reduced. Thereby, the power consumption of the UE is further reduced.

Advantageous Effects of Invention

The additional aspects and advantages of the present invention are partially provided in the following description. Those will be obviously in the following description or be understood by the practice of the present invention.

BRIEF DESCRIPTION OF DRAWINGS

FIG. 1 is a schematic flowchart of a method for receiving paging information according to the present invention;

FIG. 2 is a schematic diagram of one instance of a first method for receiving paging information based on the pre-loading paging indication information according to Embodiment 1 of the present invention;

FIG. 3 is a schematic diagram of one instance of a second method for receiving paging information based on the pre-loading paging indication information according to Embodiment 1 of the present invention;

FIG. 4 and FIG. 5 both are schematic diagrams of methods for receiving paging information based on the built-in paging indication information according to Embodiment 2 of the present invention;

FIG. 6 is a frame schematic diagram of the interior structure of an apparatus for receiving paging information according to Embodiment 4 of the present invention.

MODE FOR THE INVENTION

Embodiments of the present invention will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present invention and should not be regarded as any limitations thereto.

It should be understood by one person of ordinary skill in the art that singular forms "a", "an", "the", and "said" may be intended to include plural forms as well, unless otherwise stated. It should be further understood that terms "comprise/comprising" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it can be directly connected or coupled to other elements or provided with intervening elements therebetween. In addition, "connected to" or "coupled to" as used herein can comprise wireless connection or coupling. As used herein, the term "and/or" comprises all or any of one or more associated listed items or combinations thereof.

It should be understood by one person of ordinary skill in the art that, unless otherwise defined, all terms (including technical and scientific terms) used herein have the same meaning as commonly understood by one person of ordinary skill in the art to which the present invention belongs. It should be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by one person of ordinary skill in the art that the term "terminal" and "terminal equipment" as used herein compasses not only devices with a wireless signal receiver having no emission capability but also devices with receiving and emitting hardware capable of carrying out bidirectional communication over a bidirectional communication link Such devices can comprise cellular or other communication devices with a single-line display or multi-line display or without a multi-line display; Personal Communication Systems (PCSs) with combined functionalities of speech, data processing, facsimile and/or data communication; Personal Digital Assistants (PDAs), which may include RF receivers, pagers, internet networks/intranet accesses, web browsers, notepads, calendars and/or global positioning system (GPS) receivers; and/or conventional laptop and/or palmtop computers or other devices having and/or including a RF receiver. The "terminal" and "terminal equipment" as used herein can be portable, transportable, mountable in transportations (air, sea and/or land transportations), or suitable and/or configured to run locally and/or distributed in other places in the earth and/or space for running. The "terminal" or "terminal equipment" as used herein may be a communication terminal, an internet terminal, a music/video player terminal. For example, it can be a PDA, a Mobile Internet Device (MID) and/or a mobile phone with a music/video playback function, or can be equipment such as a smart TV and a set-top box.

The inventor/inventors of the present invention notices/notice by study, for Long-Term Evolution (LTE) system, a subframe where a PO is located is a subframe (of DCI) of Physical Downlink Control Channel (PDCCH) scrambled by Paging-Radio Network Temporary Identity (P-RNTI) and monitored by UE.

For eMTC system, a subframe where a PO is located is a starting subframe (of DCI) of repeated MTC Physical Downlink Control Channel (MPDCCH) scrambled by P-RNTI and monitored by UE.

For NB-IOT system, when a subframe where a PO is located is a valid NB-IOT downlink subframe, a subframe where a PO is located is a starting subframe (of DCI) of repeated NB-IOT Physical Downlink Control Channel (NPDCCH) scrambled by P-RNTI and monitored by UE. When a subframe where a PO is located is not a valid NB-IOT downlink subframe, the starting subframe (of DCI) of repeated NPDCCH scrambled by P-RNTI and monitored by UE is the first valid NB-IOT downlink subframe after the subframe where the PO is located.

The inventor/inventors of the present invention considers/consider that, a paging indication information can be added before the subframe where the PO is located or before the DCI containing the subframe where the PO is located, or the paging indication information is added into the DCI, so as to assist the UE to decide whether there is a paging information required to be received by the UE.

The present invention provides a method for receiving paging information, the schematic flowchart of this method is shown in FIG. 1, which comprises the following steps: S101, paging indication information is received; S102, whether one or more paging occasions (POs) have paging information required to be received by this User Equipment (UE) is determined, based on the paging indication information; S103, this paging information is received, when it is determined that one or more POs have the paging information required to be received by this UE; this paging information is ignored when it is determined that one or more POs do not have paging information required to be received by this UE. One or more paging here mean that, one or more paging information of the POs after the paging indication information, in other words, one paging indication information can determine whether there are one or more paging of POs next to the paging indication information. If one paging indication information can determine whether there are a multiple of paging of POs next to the paging indication information, the specific determined number of the multiple of paging of POs can be configured by the high-layer signaling or pre-configured by a protocol.

It can be understood, the UE receives paging indication information; determines whether one or more POs have a paging information required to be received by this UE (i.e. paging information transmitted by this base station for this UE), according to the paging indication information; when it is determined that one or more POs have a paging information required to be received by this UE, the UE receives this paging information; when it is determined that one or more POs have no paging information required to be received by this UE, the UE ignores this paging information. By doing this, a great number of processing work such as receiving, decoding and recognizing the paging information required to be received for other UEs is saved; reasonably configuring paging indication information can enable that the overhead for the processing work such as receiving paging indication information by the UE is far less than a great amount of overhead for processing the paging information for other UEs; thereby the efficiency for receiving the paging information is promoted, the system resources of the UE is saved, the power consumption of the UE is saved, and the duration of the UE is prolonged.

In the present invention, the paging indication information comprises at least one of the following: paging information indication signal, information indication of paging information indication channel, information recorded by added bit in paging control information, information recorded by redundancy bit in paging control information. Wherein, the paging control information comprises DCI.

Communication system, such as eMTC system, uses MPDCCH and MTC Physical Downlink Shared Channel (MPDCCH) to transmit paging control information and paging information, respectively.

For another example, such as NB-IOT system, which uses NPDCCH and NB-IOT Physical Downlink Shared Channel (NPDCCH) to transmit paging control information and paging information respectively.

Taking eMTC system and/or NB-IOT system as example, several embodiments of the present invention is described in detail.

Embodiment 1

In Embodiment 1 of the present invention, before paging control information to which a subframe where the PO is located belongs, the paging indication information is added. Embodiment 1 of the present invention provides three methods for receiving paging information based on the pre-loading paging indication information.

In the first method for receiving paging information based on the pre-loading paging indication information, the paging indication information is specifically a paging information indication signal. The paging information indication signal can be a radio signal transmitted by the base station independently.

The first method for receiving paging information based on the pre-loading paging indication information, comprises:

the UE receives paging information indication signal, and determines amplitude of this paging information indication signal; compares the determined amplitude of the paging information indication signal with a pre-acquired amplitude threshold of the paging information indication signal corresponding to this UE; determines whether one or more POs have paging information required to be received by this UE, according to the compared result of the amplitude.

The UE determines one or more POs (i.e. time-domain location where the PO is located) of the paging information indication signal when the above compared result of the amplitude indicates that one or more POs have paging information required to be received by this UE; receives DCI (of PDCCH) of the paging information indication signal to which one or more POs point; receives corresponding paging information, according to the DCI, i.e. receives corresponding paging information of PDSCH according to the information recorded by this DCI.

Wherein, in the time domain, the PO is equal to the time-domain location of the subframe where the PO is located. According to the DRX period T and the number of time moments (nB) for paging in each radio frame, the PO can be deduced.

Since the DCI is transmitted by PDCCH, the DCI can be called as DCI of PDCCH for short.

Specifically, as shown in FIG. 2, the UE detects paging information indication signal before the PO. Preferably, the UE receives paging information indication signal according to the time-frequency location of the paging information indication signal.

Then, the UE decides whether the amplitude of this paging information indication signal is greater than a configured amplitude threshold for determining whether there is a paging for this UE.

In other words, if the amplitude of this paging information indication signal is greater than or equal to the configured amplitude threshold, it indicates that one or more POs have paging information required to be received by this UE. The UE performs MPDCCH detection at the PO location (in time domain), or the UE performs NPDCCH detection at one or more first valid downlink subframes of the PO location, detects and obtains (i.e. receives) subframe of MPDCCH or NPDCCH, and then receives and obtains DCI of MPDCCH or NPDCCH; acquires paging information by corresponding MPDSCH or NPDSCH according to the acquired information recorded in the DCI.

If the amplitude of this paging information indication signal is less than the configured amplitude threshold, it indicates that one or more POs do not have paging information required to be received by this UE. The UE does not perform MPDCCH detection at PO location (in time domain), or the UE does not perform NPDCCH detection at one or more first valid downlink subframes of the PO location (in time domain). In other words, the UE ignores the paging control information (i.e. DCI) and corresponding paging information of one or more POs. By doing this, a great number of work such as receiving, decoding and recognizing the paging information required to be received for other UEs is saved, the efficiency for receiving the paging information is promoted, the system resources of the UE is saved, the power consumption of the UE is saved, and the duration of the UE is prolonged.

It can be understood, if the base station requires the UE to perform detection on the paging information, the base station transmits the paging information indication signal to inform the UE. When the base station has low signal coverage for the UE, the amplitude of the paging information indication signal received by the UE is normally less than the amplitude threshold. If using the prior art, the base station requires occupying many physical resources in frequency domain and time domain or other physical resources for transmitting paging information indication signal, so as to ensure the UE with low information coverage can receive correctly. At this time, the UE requires more time and more electricity to receive paging information indication signal. In the first method for receiving paging information based on the pre-loading paging indication information according to Embodiment 1 of the present invention, when the UE determines that the amplitude of the paging information indication signal is less than the amplitude threshold, the UE directly stops receiving paging control information and paging information of one or more paging (one or more POs). By doing this, a great number of work such as receiving, decoding and recognizing the paging information required to be received for other UEs is saved; reasonably configuring paging indication information used as paging indication information can enable that the overhead for the processing work such as receiving paging indication information by the UE is far less than a great amount of overhead for processing the paging control information and paging information for other UEs; thereby the efficiency for receiving the paging information is promoted, the system resources of the UE is saved, the power consumption of the UE is saved, and the duration of the UE is prolonged.

Besides, the base station can also transmit paging information indication signal to inform the UE not performing detection on the paging information. Specifically, if the amplitude of this paging information indication signal is greater than or equal to the configured amplitude threshold, the UE does not perform MPDCCH detection at the PO location, or the UE does not perform NPDCCH detection at the one or more first valid downlink subframe of the PO location (in time domain); if the amplitude of this signal is less than the configured amplitude threshold, the UE performs MPDCCH detection at the PO location, or the UE performs NPDCCH detection at the one or more first valid downlink subframes after the PO (time domain) location.

Preferably, before executing the first method for receiving the paging information based on the pre-loading paging indication information according to Embodiment 1 of the present invention, the UE can pre-acquire paging indication information of this UE and the amplitude threshold and the time-frequency location of the UE. The time-frequency location of the paging indication information is the time-domain location and frequency-domain location of the paging indication information.

Preferably, when the paging information indication signal is specifically a sequence of the paging information indication signal, the UE pre-acquires sequence, amplitude threshold, time-frequency location of the paging information indication signal and format of the sequence by at least one of the following mode: protocol pre-configuration, high-layer signaling configuration, system information indication, Mobility Management Entity (MME) configuration and recessive mode; and the time-frequency location of the paging information indication signal further comprises: time-domain relative location between the paging information indication signal and the paging occasion adjacently next to the paging information indication signal.

I. Introducing a Method for Acquiring, by the UE, the Sequence of Paging Information Indication Signal.

First, the communication system determines a group of sequences as sequences of the paging information indication signal by a protocol, wherein, this group of sequences contains at least one sequence of the paging information indication signal. The UE acquires at least one sequence in a group of sequences as the sequence of the paging information indication signal of this UE by receiving information transmitted by the base station; or, the UE acquires at least one sequence in a group of sequences as the sequence of the paging information indication signal of this UE by recessive mode.

Preferably, for the UE in the connected state, the UE can acquire at least one sequence in a group of sequences as the sequence of the paging information indication signal of this UE by receiving high-layer signaling; or the UE can acquire at least one sequence in a group of sequences as the sequence of the paging information indication signal of this UE by receiving system information; or if UE acquires at least one sequence in a group of sequences by high-layer signaling, then the UE uses acquired at least one sequence as the sequence of the paging information indication signal of this UE, if the UE does not receives the high-layer signaling, and the UE does not acquire at least one sequence in a group of sequences, the UE acquires at least one sequence in a group of sequences as the sequence of the paging information indication signal of this UE by receiving system information.

Preferably, for the UE in the idle-state, the UE can acquire at least one sequence in a group of sequences used by the UE as the sequence of the paging information indication signal of this UE by receiving system information; or the UE acquires at least one sequence in a group of sequences used by the UE as the sequence of the paging information indication signal of this UE by receiving MME configuration; the MME configuration described here means that the UE receives the high-layer signaling configuration in the connected state, wherein, the configuration remains the same while UE transfers from the connected state to the idle state; or if the UE acquires at least one sequence in a group of sequences by receiving the MME configuration, then the UE uses at least one acquired sequence as the sequence of the paging information indication signal of this UE, if the UE does not receive MME configuration and does not acquire at least one sequence in a group of sequences, then the UE acquires at least one sequence in a group of sequences as the sequence of the paging information indication signal of this UE by receiving system information.

Preferably, the UE acquires at least one sequence in a group of sequences as the sequence of the paging information indication signal of this UE by a recessive mode. For example, the UE can determine the sequence of the paging information indication signal for this UE according to the Identification (ID) of this UE.

II. Introducing a Method for Acquiring, by the UE, the Time-Frequency Location of the Paging Information Indication Signal.

In Embodiment 1 of the present invention, the paging control information is specifically the DCI. The PO can be deduced according to DRX period T and number of time moments (nB) of paging in each radio frame indicated in the system information. In other words, each PO (i.e. the time-domain location represented by the PO) can be determined by the UE in advance.

The time-domain location of the paging information indication signal is determined according to a multiple of POs (time-domain locations represented by those POs) and configuration information received by the UE (issued by the base station). The configuration information can contain time-domain relative location between the paging information indication signal and the paging occasion adjacently next to the paging information indication signal. Further, the configuration information can also contain the time-domain location of the paging information indication signal. Preferably, the configuration information can contain the frequency-domain location of the paging information indication signal; the UE acquires the frequency-domain location of the paging information indication signal by receiving configuration information.

Preferably, the time-domain location of the paging information indication signal is determined according to the PO (the time-domain location represented by the PO) and configuration information received by the UE. In other words, the time-domain relative location between the paging information indication signal and the PO, and the frequency-domain location of the paging information indication signal is obtained by the configuration information transmitted by the base station received by the UE.

Preferably, for the UE in the connected state, the UE can acquire configuration information containing the time-frequency location of the paging information indication signal by receiving high-layer signaling; or the UE can acquire configuration information containing the time-frequency location of the paging information indication signal by receiving system information. Or, if the UE acquires configuration information containing a candidate time-domain relative location between paging information indication signal and adjacent PO and frequency-domain location of the paging information indication signal by receiving high-layer signaling, then the UE uses this configuration information to obtain the time-domain relative location of the paging information indication signal and the PO and frequency-domain location. For example, there are many time-domain relative locations between paging information indication signal and the adjacent PO by default pre-stored in the UE, which includes 0.1 ms, 0.2 ms, 0.3 ms and 0.4 ms; there are not so many candidate time-domain relative locations contained in the configuration information which includes 0.2 ms and 0.3 ms corresponding to narrow down the selection range of the time-domain relative locations; the UE can determine the time-domain relative locations between paging information indication signal of this UE and the adjacent PO is 0.2 ms according to this configuration information. Or, if the UE does not acquire configuration information containing a candidate time-domain relative location between paging information indication signal and adjacent PO and frequency-domain location of the paging information indication signal by receiving high-layer signaling, then the UE acquires configuration information containing a candidate time-domain relative location between paging information indication signal and adjacent PO and frequency-domain location of the paging information indication signal by receiving system information, then the UE uses this configuration information to obtain the time-domain relative location of the paging information indication signal and the PO and frequency-domain location.

Preferably, for the UE in the idle state, the UE can acquire configuration information containing the time-frequency location of the paging information indication signal by receiving system information; or the UE can acquire configuration information containing the time-frequency location of the paging information indication signal by receiving MME configuration, the MME configuration described here means the UE receives high-layer signaling configuration while the UE is in the connected state, wherein, the configuration remains the same while UE transfers from the connected state to the idle state; or if the UE acquires configuration information containing time-domain relative location between the paging information indication signal and the adjacent PO and the frequency-domain location of the paging information indication signal by receiving MME configuration, then the UE uses this configuration information to obtain the time-domain relative location and frequency-domain location between the paging information indication signal and the PO, if the UE does not acquire configuration information containing time-domain relative location between the paging information indication signal and the adjacent PO and the frequency-domain location of the paging information indication signal by receiving MME configuration, then the UE acquires configuration information containing time-domain relative location between the paging information indication signal and the adjacent PO and the frequency-domain location of the paging information indication signal by receiving system information, then the UE uses this configuration information to obtain the time-domain relative location of the paging information indication signal and the PO and frequency-domain location.

Further, the time-domain relative location between the paging information indication signal and the adjacent PO can be predefined. The time-domain location of the paging information indication signal is determined according to a multiple of POs (time-domain location represented by those POs) and the predefined time-domain relative location in the configuration information.

For example, the paging information indication signal is located at the second Orthogonal Frequency Division Multiplexing (OFDM) symbol to the third OFDM symbol of a subframe before the PO. The frequency-domain location of the paging information indication signal can be pre-configured by a protocol, for example, the paging information indication signal is located at the $n^{th}$ to the $(n+k)^{th}$ physical resource block of the second OFDM symbol to the third OFDM symbol of a subframe before the PO. Wherein, n and k are both positive integers Besides, the inventor/inventors of the present invention also notices/notice that, some UEs have been in the DRX state for a short time period, therefore, the UE is still in a downlink synchronization state while awaking from a DRX state, on the other side, some UEs have been in a DRX state for a long time period, therefore, the UE is not in a downlink synchronization state while awaking from a DRX state. At this time, the UE synchronization state can be resumed according to the paging information indication signal.

Preferably, while the UE detects that this UE losses the downlink synchronization state, the UE determines the one or more POs adjacently next to the paging information indication signal; the UE resumes the downlink synchronization state, according to the one or more POs adjacently next to the paging information indication signal.

Specifically, while the UE detects that this UE losses the downlink synchronization state, the UE can detect the paging information indication signal, and after the UE detects the paging information indication signal (its the time-domain location), the UE determines the one or more POs (the time-domain location represented by the PO) adjacently next to the paging information indication signal according to the time-domain relative location between the paging information indication signal and the PO, so as to resume the downlink synchronization state according to the one or more POs adjacently next to the paging information indication signal.

III. Introducing a Method for Acquiring Format of Paging Information Indication Signal.

The format of the paging information indication signal can be the length of the paging information indication signal sequence. The length of the paging information indication signal sequence can be pre-configured by a protocol, or the UE can obtain by receiving high-layer signaling configuration, or the UE can obtain by MME configuration, or the UE can obtain by system information indication.

IV. Introducing a Method for Acquiring, by the UE, Amplitude Threshold of Paging Information Indication Signal The amplitude threshold of paging information indication signal can be pre-configured by a protocol, or the UE can obtain by receiving high-layer signaling configuration, or the UE can obtain by MME configuration, or the UE can obtain by system information indication.

When the sequence of the paging information indication signal is at least two sequences of the paging information indication signal, at least two sequences of the paging information indication signal are matched to at least one amplitude threshold of the paging information indication signal.

Preferably, if the UE acquires more than one sequence of the paging information indication signal, the amplitude threshold respectively matched to each sequence of the paging information indication signal can be a same amplitude threshold, or each sequence of paging information indication signal can independently match to respective amplitude threshold. Besides, the amplitude threshold of paging information indication signal can also be determined by the UE.

The above described I to IV are methods for respective acquiring sequence of the paging information indication signal, time-frequency location of the paging information indication signal, amplitude threshold of the paging information indication signal, format of the sequence of the paging information indication signal. In fact, at least one of the sequences of the paging information indication signal, time-frequency location of the paging information indication signal, amplitude threshold of the paging information indication signal, format of the sequence of the paging information indication signal is acquired simultaneously by one information. For example, the time-frequency location of the paging information indication signal, and the format of the sequence of the paging information indication signal etc., can be acquired simultaneously by one configuration information.

The first method for receiving paging information based on the pre-loading paging indication information is specifically introduced in the following, according to the sequence, time-frequency location, amplitude threshold and format of sequence of the above acquired paging information indication signal.

When the UE has already acquired the sequence of the paging information indication signal, time-frequency location of the paging information indication signal, amplitude threshold of the paging information indication signal, format (of the sequence) of the paging information indication signal, the UE receives the paging information indication signal according to the acquired time-frequency location of the paging information indication signal, determines the received amplitude of the paging information indication signal, and compares the amplitude of the received paging information indication signal with the amplitude threshold matching to this sequence so as to determine whether there is a paging for this UE.

When the UE determines that the amplitude (of the sequence) of the paging information indication signal is greater than or equal to matched amplitude threshold, the UE determines that one or more POs have the paging information required to be received by this UE, and specifically determines that there is a paging (control information) for this UE at the time-domain location represented by the PO after this signal; when the UE determines that the amplitude (of the sequence) of the paging information indication signal is less than the matched amplitude threshold, the UE determines that one or more POs do not have the paging information required to be received by this UE, and specifically determines that there is no paging (control information) for this UE at the time-domain location represented the PO after this signal Further, when the sequence of the paging information indication signal is at least two sequences of the paging information indication signal, the UE compares the amplitudes of at least two sequences of the paging information indication signal with each matched amplitude threshold respectively, or the UE compares amplitude of sequence of each paging information indication signal with the amplitude threshold matched to this sequence in order, until the amplitude is greater than or equal to the amplitude threshold matched to this sequence.

Preferably, if the UE acquires more than one sequence of the paging information indication signal, the UE can perform comparison on each sequence independently. The UE respectively acquire respective amplitude of different sequences, and compares the obtained respective amplitude of different sequences with respective matching amplitude threshold of each sequence to determine whether there is a paging for this UE, i.e. the UE determines that the amplitude of at least one sequence is greater than or equal to the amplitude threshold matched to this sequence. Therefore, the UE determines that there is a paging (control information) for this UE at the time-domain location represented by the PO after this signal; when the UE determines that amplitude of each sequence is less than the amplitude threshold matched to this sequence, the UE determines that there is no paging (control information) for this UE at the time-domain location represented by the PO after this signal.

Preferably, if the UE acquires more than one sequence of the paging information indication signal, the UE can perform amplitude comparison on each sequence in order. The UE obtains amplitude of a sequence according to the order of the protocol configuration and the high-layer signaling configuration, and compares the obtained amplitude of the sequence with the amplitude threshold matched to this sequence, if the amplitude of this sequence is greater than or equal to the amplitude threshold matched to this sequence, then the UE determines that there is a paging (control information) for this UE at the time-domain location represented by the PO after this signal, and stops the amplitude comparison operation for the remaining sequences; if the amplitude of this sequence is less than the threshold matched to this sequence, then the UE acquires amplitude of the next sequence in order, and compares the acquired amplitude of the next sequence with the amplitude threshold matched to the next sequence until the UE determines a sequence whose amplitude is greater than or equal to the amplitude threshold matched to this sequence. Furthermore, different sequences represent different meaning, for example, if the UE acquires two sequences of the paging information indication signal and detects that the first sequence has the amplitude greater than or equal to the amplitude threshold matching to this first sequence, it represents that the UE determines that there is a paging (control information) for this UE at the time-domain location which is represented by the PO after the paging information indication signal, and then the UE detects this paging information; when the UE detects that the second sequence has the amplitude greater than or equal to the amplitude threshold matching to this second sequence, it represents that the UE determines that there is no paging (control information) for this UE at the time-domain location which is represented by the PO after this signal, and then the UE does not detects this paging information.

Besides, the paging information indication signal can indicate updating system information, and can also indicate a paging for the UE, the sequence of the paging information indication signal for indicating updating system information can be different from the sequence of the paging information indication signal for indicating there is a paging for this UE. Therefore, if belonging to a condition of updating system information, and there is not paging for the UE, then the base station only needs to transmit one sequence for updating a system, since the sequence for updating the system is for all the UEs, the sequence for the paging of the UE is possible for part of the UEs, therefore, the resource of the transmitting sequence is saved. Moreover, since the UE only needs to receive one sequence, the power consumption of the UE is further reduced.

Further, the base station can also transmit same paging indication information for the same group of UEs. Therefore, the overhead for transmitting paging indication information can be saved.

Regarding the paging indication information in the first method for receiving paging information based on the above pre-loading paging indication information, the base station transmits without using the channel; in the second method for receiving paging information based on the above pre-loading paging indication information, the base station can create a designed paging information indication channel designed for transmitting paging indication information. Therefore, in the second method for receiving paging information based on the above pre-loading paging indication information, the paging indication information is specifically information indication of the paging information indication channel.

The second method for receiving paging information based on the above pre-loading paging indication information, comprises:

the UE blind detects the information indication of the paging information indication channel; and determines whether one or more POs have paging information required to be received by this UE according to whether information indication of the paging information indication channel is obtained by blind detection.

When the UE obtains the information indication of the paging information indication channel by blind detection, the UE determines the one or more POs adjacently next to the information indication of the paging information indication channel; receives the DCI of the PDCCH to which this PO points; receives paging information of corresponding PDSCH according to the DCI to which this PO points, i.e. receives paging information corresponding to PDSCH according to the information recorded by this DCI.

Preferably, as shown in FIG. 3, the UE determines whether there is a paging for this UE by blind detecting a channel of one downlink control information; if this channel is before the PO, this channel is called as paging information indication channel. The information indication of this channel is used to determine whether there is a paging for this UE. This channel is transmitted before the PO.

The UE determines whether the UE performs MPDCCH detection at the time-domain location represented by the PO by reading the indication information transmitted by this channel, or the UE performs NPDCCH detection at the one or more first valid downlink subframe of the time-domain location represented by the PO. If UE receives information indication of the paging information indication channel before the PO, it indicates that one or POs have paging information required to be received by this UE, then the UE performs MPDCCH detection at the time-domain location represented by the PO, or the UE performs NPDCCH detection at the one or more first valid downlink subframes of the time-domain location represented by the PO, detects and obtains (i.e. receives) subframe of MPDCCH or NPDCCH, and then receives DCI of MPDCCH or NPDCCH, and then receives and obtains DCI of MPDCCH or NPDCCH; receives paging information of corresponding MPDSCH or NPDSCH according to the information recorded by this DCI.

If the UE does not receives information indication of paging information indication channel before the PO, it indicates that one or more POs have no paging information required to be received by this UE, then the UE does not perform MPDCCH detection at the time-domain location represented by the PO, or the UE does not perform NPDCCH detection at the one or more first valid downlink subframes of the time-domain location represented by the PO. Therefore, in the second method for receiving paging information based on the pre-loading paging indication information according to Embodiment 1 of the present invention, when the UE does not receive information indication of the paging information indication channel before the PO, the UE directly stops receiving the paging control information (i.e. specifically DCI in the second method for receiving the paging information based on the pre-loading paging indication information according to Embodiment 1 of the present invention) and paging information of one or more paging (one or more POs). By doing this, a great number of work such as receiving, decoding and recognizing the paging indication information and the paging information required to be received for other UEs is saved; reasonably configuring information indication of the paging indication information channel (as paging indication information of paging indication information) can enable that the overhead for the processing work such as receiving information indication of paging indication information channel by the UE is far less than a great amount of overhead for processing the paging control information and paging information for other UEs; thereby the efficiency for receiving the paging information is promoted, the system resources of the UE is saved, the power consumption of the UE is saved, and the duration of the UE is prolonged.

Preferably, before executing the second method for receiving the paging information based on the pre-loading paging indication information according to Embodiment 1 of the present invention, the UE pre-acquires information indication of the paging information indication channel required to be received by this UE and the time-frequency location and format of this information indication. The time-frequency location of the information indication of the paging information indication channel is the time-domain location of the information indication of the paging information indication channel and frequency-domain location.

Preferably, when the information indication of the paging information indication channel is specifically a multiple of bit information of the paging information indication channel, pre-acquiring the information indication of the paging information indication channel and time-frequency location and format of the information indication by at least one of the following modes: protocol pre-configuration, high-layer signaling configuration, system information indication, MME configuration and recessive mode. And the time-frequency location of the information indication of the paging information indication channel further comprises: time-domain relative location between the information indication of the paging information indication channel and the PO adjacently next to the paging information indication channel.

(1) Introducing a Method for Acquiring Information Indication of Paging Information Indication Channel by the UE.

There are N bit information in a paging information indication channel (wherein, N is a positive integer, which can be pre-configured by a protocol or configured by high-layer signaling), wherein, each bit indicates that whether the paging information of each group of the UEs is existed, each bit is used to indicate that whether this group of UEs performs MPDCCH detection at the PO location (i.e. the time-domain location represented by the PO), or the UE performs NPDCCH detection at the one or more first valid downlink subframes of the PO location.

For example, when the bit value is "0", the UE determines that one or more POs have the paging information required to be received by this UE, then the UE performs MPDCCH detection at the PO location, or the UE performs NPDCCH detection at the one or more first valid downlink subframes of the PO location; when the bit value is "1", the UE determines that one or more POs have not have the paging information required to be received by this UE, then the UE does not perform MPDCCH detection at the PO location, or the UE does not perform NPDCCH detection at the one or more first valid downlink subframes of the PO location. Wherein, the mapping relation between each bit indication information and each group of UEs can be obtained by high-layer signaling configuration, system information indication or recessive mode; for example, the mapping relation can be deduced by the ID of the UE (belonging to the recessive mode).

(2) Introducing a Method for Acquiring Time-Frequency Location of Information Indication of the Paging Information Indication Channel by the UE.

According to configuration information of a multiple of POs (time-domain locations those POs represent) and configuration information received by the UE (issued by the base station), the UE determines the time-domain location of the information indication of the paging information indication channel. The configuration information can contain the time-domain relative location between the information indication of the paging information indication channel and the adjacent PO. Further, the configuration information can also contain time-domain location of the information indication of the paging information indication channel. Preferably, the configuration information can contain frequency-domain location of the information indication of the paging information indication channel; the UE acquires frequency-domain location of the information indication of the paging information indication channel by receiving configuration information.

Preferably, the time-domain location of the information indication of the paging information indication channel is obtained by the PO location and configuration information received by the UE, in other words, the time-domain relative location of the information indication of the paging information indication channel and the PO, the frequency-domain location of the information indication of the paging information indication channel is obtained by the configuration information transmitted by the base station received by the UE.

Preferably, for the UE in the connected state, the UE can acquire configuration information containing frequency-domain location of the information indication of the paging information indication channel by receiving the high-layer signaling; or the UE can acquire configuration information containing time-frequency location of the information indication of the paging information indication channel by receiving system information. Or, if the UE acquires configuration information by receiving high-layer signaling, this configuration information contains candidate time-domain relative location between the information indication of the paging information indication channel and the adjacent PO and the frequency-domain location of the information indication of the paging information indication channel, then the UE uses this configuration information to obtain time-domain relative location of the information indication of the paging information indication channel and the PO and the frequency-domain location of the information indication of the paging information indication channel, if this UE does not receive high-layer signaling to acquire configuration information, then the UE acquires configuration information by receiving system information, this configuration information contains candidate time-domain relative location between the information indication of the paging information indication channel and the adjacent PO and the frequency-domain location of the information indication of the paging information indication channel; the UE uses this configuration information to obtain the time-domain relative location of the information indication of the paging information indication channel and the PO and the frequency-domain location of the information indication of the paging information indication channel.

Preferably, for the UE in the idle state, the UE can acquire configuration information containing time-frequency location of the information indication of the paging information indication channel by receiving system information; or the UE can obtain configuration information containing time-frequency location of the information indication of the paging information indication channel by receiving system information, the MME configuration described here means the UE receives high-layer signaling configuration while the UE is in the connected state, wherein, the configuration remains the same while UE transfers from the connected state to the idle state; or if the UE acquires configuration information by receiving MME configuration, this configuration information contains candidate time-domain relative location between the information indication of the paging information indication channel and the adjacent PO and the frequency-domain location of the information indication of the paging information indication channel, then the UE uses this configuration information to obtain time-domain relative location of the information indication of the paging information indication channel and the PO and the frequency-domain location of the information indication of the paging information indication channel, if the UE does not acquire the configuration information by receiving MME configuration, then the UE acquires the configuration information by receiving system information, this configuration information contains candidate time-domain relative location between the information indication of the paging information indication channel and the adjacent PO and the frequency-domain location of the information indication of the paging information indication channel, the UE uses this configuration information to obtain the time-domain relative location of the information indication of the paging information indication channel and the PO and the frequency-domain location of the information indication of the paging information indication channel.

Further, the time-domain relative location between the information indication of the paging information indication channel and the adjacent PO can be predefined. The time-domain location of the information indication of the paging information indication channel is determined according to a multiple of POs (time-domain location represented by those POs) and the predefined time-domain relative location in the configuration information.

For example, the paging information indication channel is located between the second Orthogonal Frequency Division Multiplexing (OFDM) symbol and the third OFDM symbol of a subframe before the PO. The frequency-domain location of the information indication of the paging information indication channel can be pre-configured by a protocol, for example, the information indication of the paging information indication channel is located at the $n^{th}$ to $(n+k)^{th}$ physical block of the second OFDM symbol to the third OFDM symbol of a subframe before the PO.

(3) Introducing a Method for Acquiring Format of the Information Indication of the Paging Information Indication Channel by the UE.

The format of the information indication of the paging information indication channel can be pre-configured by a protocol, or the format of the information indication of a multiple of paging information indication channel can be pre-configured by a protocol. Then, the UE configures which specific format the format of the information indication of the paging information indication channel is. The UE can obtain which specific format the format of the information indication of the paging information indication channel is by the MME configuration, or can obtain which specific format the format of the information indication of the paging information indication channel is by system information indication, or can obtain by blind detecting several formats. The format of the information indication of the paging information indication channel described here means the number of the information bit in the paging information indication channel.

The above (1) to (3) related to the second method for receiving paging information based on the pre-loading paging indication information described are methods for respective acquiring information indication of the paging information indication channel, the time-frequency location and format of the information indication. In fact, at least one of information indication of the paging information indication channel, the time-frequency location and format of the information indication is acquired simultaneously by one information. For example, the time-frequency location and format of the information indication of the information indication of the paging information indication channel can be acquired simultaneously by one configuration information.

The second method for receiving paging information based on the pre-loading paging indication information is introduced specifically in the following, according to the information indication of the paging information indication channel, the time-frequency location and format of the information indication.

When the UE has already acquired the information indication of the paging information indication channel, the time-frequency location and format of the information indication, the UE attempts to blind detect the information indication of the paging information indication channel according to the acquired time-frequency location of the information indication of the paging information indication channel, and then determines whether there is a paging for this UE according to whether the information indication of the paging information indication channel is detected.

When the UE blind detects the information indication of the paging information indication channel according to the acquired time-frequency location of the information indication of the paging information indication channel, the UE determines one or more POs have paging information required to be received by this UE, and specifically determines there is paging (control information) for this UE from the time-domain location represented by the PO after the information indication of the paging information indication channel.

When the UE cannot blind detect the information indication of the paging information indication channel according to the acquired time-frequency location of the information indication of the paging information indication channel, the UE determines that one or more POs do not have paging information required to be transmitted by this UE, and specifically determines there is no paging (control information) for this UE from the time-domain location represented by the PO after the information indication of the paging information indication channel.

Besides, the UE respectively blind detects information indication of the paging information indication channel for indicating updating system information and information indication of the paging information indication channel for indicating that there is paging for the UE by independent DCI.

Specifically, the paging information indication channel for indicating updating system information and the paging information indication channel for indicating that there is paging for the UE can pass through independent DCI.

If the UE receives the information indication of the paging information indication channel for indicating updating system information, and the UE does not receive information indication of the paging information indication channel for the paging of the UE, then the UE can directly receive the system information and does not receive the paging information for indicating updating the system information. Therefore, for the condition that there is only system updating, the receiving operation of the paging control information of MPDCCH and corresponding paging information of MPDSCH or the paging control information of NPDCCH and corresponding paging information of NPDSCH for the paging of the UE is reduced.

If the UE receives the information indication of the paging information indication channel for the paging of the UE, the UE directly receives the paging information for the UE. Therefore, for the condition that there is only for the paging of the UE, the receiving operation of the paging control information of MPDCCH and corresponding paging information of MPDSCH or the paging control information of NPDCCH and corresponding paging information of NPDSCH for indicating updating system information is reduced.

Further, the information indication of the paging information indication channel for indicating system updating and the information indication of the paging information indication channel for indicating there is paging for the UE can use different DCI, however, the number of the bit is the same. Therefore, the UE can distinguish whether there is system information updating or paging for the UE according to different DCI.

The third method for receiving paging information based on the pre-loading paging indication information according to Embodiment 1 of the present invention is introduced specifically in the following.

The inventor/inventors notices/notice that, in the first and second methods for receiving paging information based on the pre-loading paging indication information, the UE determines the paging control information of MPDCCH and corresponding paging information of MPDSCH or the paging control information of NPDCCH and corresponding paging information of NPDSCH in this time PO (i.e. one or more POs) according to the receiving auxiliary information before each PO.

However, for the UE with low signal coverage, such as the UE that the received amplitude of the paging information indication signal is always less than the amplitude threshold in the first method for receiving paging information based on the pre-loading paging indication information in Embodiment 1 of the present invention, or the UE that the paging information indication channel is always not blind detected in the second method for receiving paging information based on the pre-loading paging indication information in Embodiment 1 of the present invention, may frequently miss this paging indication information. Accordingly, the receiving paging information is missed.

Therefore, a method for receiving paging information according to the paging indication information in combination with the period is used to save the power of the UE and ensure the performance of the reception of the paging information simultaneously.

When the compared result of the amplitude of the paging information indication signal or the compared result of the information indication of the paging information indication channel indicates that there is no paging information required to be received by this UE, in the N times paging transmission process, M times paging information is received; wherein, M and N are both positive integers, and M is less than or equal to N.

As shown in FIG. 4, in the N times paging transmission, the UE has to receive at least M times paging information, no matter whether the UE receives paging indication information.

The specific method can be, as shown in FIG. 5, beginning from a predefined starting time, if the UE has received L times paging information according to the paging indication information in N times POs (one time paging contains one time PO), and L is less than M, then the UE receives the paging information at the last (M-L) paging information receiving moments in the N times paging information receiving moments, no matter whether the UE has received the paging indication information. Wherein, N is a positive integer which is configured by high-layer signaling, or pre-configured by a protocol, or configured by MME. Wherein, M is a positive integer which is configured by high-layer signaling, or pre-configured by a protocol, or configured by MME, wherein, M is less than or equal to N, for example, M is equal to 1.

Besides, the method that the UE receives the paging information according to the paging indication information or the UE receives the paging information according to the paging indication information in combination with the period can be configured by the high-layer signaling, or can be configured by MME, or can be determined by the UE according to the signal amplitude measured by the UE.

Embodiment 2

In Embodiment 2 of the present invention, the paging indication information is added into the paging control information to which the PO points.

In the method for receiving paging information based on the pre-loading paging indication information according to Embodiment 2 of the present invention, the paging indication information is specifically added bit and/or redundancy bit in the paging control information. Preferably, adding bit filling with paging indication information on the basis of initial DCI or filling the redundancy bit of the initial DCI with the paging indication information to form the paging control information of Embodiment 2 of the present invention.

The method for receiving paging information based on the built-in paging indication information according to Embodiment 2 of the present invention, comprises: receiving the added bit and/or redundancy bit in the paging control information prior to paging information; and determining whether one or more POs have paging information required to be received by this UE, according to the received information recorded by the added bit and/or redundancy bit; receiving this paging information, when it is determined that one or more POs have paging information required to be received by this UE.

Preferably, Embodiment 2 of the present invention describes that, the UE determines whether the UE receives the paging information of MPDSCH or paging information of NPDSCH of this time PO by receiving the paging control information of MPDCCH or the paging control information of NPDCCH.

The paging control information of Embodiment 2 is formed by filling the added bit and/or redundancy bit with the paging indication information, according to adding bit in the DCI of MPDCCH or DCI of NPDCCH or reusing the redundancy bit of the current DCI of MPDCCH or DCI of NPDCCH. The formed paging control information of Embodiment 2 is used for indicating the UE whether it is required to receive the paging information of MPDSCH scheduled by the paging control information of MPDCCH or the paging information of NPDSCH scheduled by the paging control information of NPDCCH.

The specific indication mode can be M bit information, wherein, one bit is used to indicate whether the UE performs MPDCCH detection at the PO location, or the UE performs NPDCCH detection at the one or more first valid downlink subframes of the PO location.

For example, when the bit value "0", UE performs MPDCCH detection at the PO location, or performs NPDCCH detection at the one or more first valid downlink subframe of the PO location; when the bit value "1", UE does not perform MPDCCH detection at the PO location, or does not perform NPDCCH detection at the PO location or does not perform NPDCCH detection at the one or more first valid downlink subframes at the PO location. The location of one bit information in M bit information can be configured by high-layer signaling, or can be obtained by a recessive mode, for example, the location can be deduced by recognizing the UE (the ID of the UE).

In Embodiment 2 of the present invention, the paging control information (of Embodiment 2 of the present invention) is formed by adding bit on the basis of the current DCI for filling the added bit with the paging indication information, or filling the redundancy bit with the paging indication information. Reasonably configuring paging indication information can enable that the overhead for the processing work such as receiving paging indication information by the UE is far less than a great amount of overhead for processing the paging information for other UEs; thereby the efficiency for receiving the paging information is promoted, the system resources of the UE is saved, the power consumption of the UE is saved, and the duration of the UE is prolonged. Moreover, the current system resource is fully used, the change to the communication system is small, the compatibility with the current communication system is good, the cost is low, and the application is broader.

Embodiment 3

The method for receiving paging information according to Embodiment 3 of the present invention is the improvement to the second or the third method for receiving paging information based on the pre-loading paging indication information according to the above Embodiment 1.

The improvement mainly comprises: blind detecting the information indication of the paging information indication channel having a same number of times of blind detection, according to a specified number of times of blind detection; the remaining steps are the same as the steps of the second method for receiving paging information based on the pre-loading paging indication information in the above Embodiment 1, and will not be repeated here.

Preferably, when the paging information indication channel used as the object of the blind detection is specifically MPDCCH or NPDCCH, the embodiment describes that, the UE reduces the consumed power for receiving DCI of MPDCCH or NPDCCH by changing repeated times for blind detecting information indication of MPDCCH or information indication of NPDCCH.

The maximum repeated times for blind detecting MPDCCH or NPDCCH used for paging can be recorded as Rmax_paging, and the UE can obtain Rmax_paging by receiving system information, or can obtain by MME high-layer signaling configuration, if the UE obtains Rmax_paging only by receiving system information, then the UE uses this Rmax_paging to blind detect the information indication of MPDCCH or the information indication of NPDCCH; if the UE obtains Rmax_paging by receiving system information, then this Rmax_paging is recorded as Rmax_paging_1, if the UE simultaneously obtains Rmax_paging by MME high-layer signaling configuration, this Rmax_paging is recorded as Rmax_paging_2, then the UE uses Rmax_paging_2 to blind detect the information indication of MPDCCH or the information indication of NPDCCH, or the UE can use the smaller one between Rmax_paging_1 and Rmax_paging_2 to blind detect the information indication of MPDCCH or the information indication of NPDCCH.

When the UE receives paging information, the UE determines whether to apply the methods of the above Embodiment 1, Embodiment 2 or Embodiment 3 by the system information indication received by the UE; or for the UE in the idle state, the UE determines by the MME high-layer signaling configuration, for the UE in the connected state, the UE determines by high-layer signaling configuration. If the UE does not receive the enhanced paging information reception indicated by the system information, then the UE is not able to use enhanced methods for receiving paging information of the above Embodiment 1, Embodiment 2 and Embodiment 3; or for the UE in the idle state, the enhanced paging information reception configured by MME high-layer signaling is not received by the UE, for the UE in the connected state, if the UE does not receive the enhanced paging information reception configured by the high-layer signaling, then the UE is not able to use the enhanced method for receiving paging information of the above Embodiment 1, Embodiment 2 and Embodiment 3.

Embodiment 4

Embodiment 4 of the present invention provides an apparatus for receiving paging information based on the methods for receiving paging information of the above Embodiments 1 to 3, this apparatus is arranged in the UE, frame schematic diagram of the interior structure of this apparatus is shown in FIG. 6, comprises: an information receiving module 601 and a paging information determination module 602;

wherein, the information receiving module 601 is configured to receive paging indication information; and receive this paging information, when the paging information determination module 602 determines that one or more POs have the paging information by the paging determination module.

The paging information determination module 602 is configured to determine whether one or more POs have paging information required to be received by this UE, based on the paging indication information.

Preferably, the information receiving module 601 is configured to receive the paging information indication signal, and determines the amplitude of the paging information indication signal.

Moreover, the paging information determination module 602 is configured to compare the amplitude of the paging information indication signal determined by the information receiving module 601 with pre-acquired amplitude threshold of the paging information indication signal corresponding to this UE; determine whether one or more POs have paging information required to be received by this UE, according to the compared result of the amplitude.

Preferably, the paging information determination module 602 is configured to determine one or more POs adjacently next to the paging information indication signal, when the compared result of the amplitude indicates that one or more POs have paging information required to be received by this UE; and the information receiving module 601 is configured to receive the paging control information to which the one or more POs points adjacently next to the paging information indication signal determined by the paging information determination module 602; receive corresponding paging information according to this paging control information.

Preferably, the information receiving module 601 is configured to receive paging information indication signal according to time-frequency location of the paging information indication signal.

Preferably, the information receiving module 601 is configured to when the paging information indication signal is specifically a sequence of the paging information indication signal, pre-acquire sequence, amplitude threshold, time-frequency location of the paging information indication signal and format of the sequence by at least one of the following modes: protocol pre-configuration, high-layer signaling configuration, system information indication, Mobility Management Entity (MME) configuration and recessive mode; and the time-frequency location further comprises: time-domain relative location between the paging information indication signal and the Paging Occasion (PO) adjacently next to the paging information indication signal.

Preferably, the paging information determination module 602 is configured to compare, when the sequence of the paging information indication signal is at least two sequences of the paging information indication signal, the amplitudes of at least two sequences of the paging information indication signal with each matched amplitude threshold respectively, or compare amplitude of sequence of each paging information indication signal with the amplitude threshold matched to this sequence in order, until the amplitude is greater than or equal to the amplitude threshold matched to this sequence. Wherein, at least two sequences of the paging information indication signal are matched to at least one amplitude threshold of the paging information indication signal.

Preferably, the paging information determination module 602 is configured to determine the one or more POs adjacently next to the paging information indication signal when it is detected that the UE is not in a downlink synchronization state; resume downlink synchronization state according to the one or more POs adjacently next to the paging information indication signal.

More preferably, the information receiving module 601 is configured to blind detect information indication of paging information indication channel.

Moreover, the paging information determination module 602 is configured to determine whether one or more POs have paging information required to be received by this UE, according to whether the information receiving module 601 can obtain the information indication of the paging information indication channel by blind detection.

Preferably, the paging information determination module 602 is configured to determine the one or more POs adjacently next to the information indication of the paging information indication channel, when the information receiving module 601 obtains the information indication of the paging information indication channel by blind detection; and the information receiving module 601 is configured to receive the paging control information to which the one or more POs points adjacently next to the paging information indication channel determined by the paging information determination module 602; receive corresponding paging information according to this paging control information.

Preferably, the information receiving module 601 is configured to blind detect information indication of the paging information indication channel, according to time-frequency location of the information indication of the paging information indication channel.

Preferably, the information receiving module 601 is configured to pre-acquire, when the information indication of paging information indication channel is specifically a multiple of bit information of paging information indication channel, the information indication of the paging information indication channel and time-frequency location and format of the information indication by at least one of the following modes: protocol pre-configuration, high-layer signaling configuration, system information indication, MME configuration and recessive mode. And the time-frequency location of the information indication further comprises: time-domain relative location between the information indication of the paging information indication channel and the PO adjacently next to the paging information indication channel.

Preferably, the information receiving module 601 is configured to respectively blind detect, by independent DCI, information indication of paging information indication channel indicative of updating system information and information indication of paging information indication channel indicative of with respect to the UE.

More preferably, the information receiving module 601 is configured to receive M times of paging information, in the N times of paging transmission process, when the compared result of the amplitude or the information indication determined by the paging information determination module 602 indicates that there is no the paging information required to be received by the UE; wherein, M and N are both positive integers, and M is less than or equal to N.

More preferably, the information receiving module 601 is configured to receive the added bit and/or redundancy bit in the paging control information prior to paging information; and, the paging information determination module 602 is configured to determine whether one or more POs have paging information required to be received by this UE according to information recorded by the received added bit and/or redundancy bit.

More preferably, the information receiving module 601 is configured to blind detect the information indication of the paging information indication channel having a same number of times of blind detection, according to a specified number of times of blind detection.

The implementation method of the function of the above information receiving module 601 and paging information determination module 602 can refer to the specific contents in the above Embodiments 1 to 3, and will not be repeated here.

It should be understood by those skilled in the art that the present invention involves devices for carrying out one or more of operations as described in the present invention. Those devices can be specially designed and manufactured as intended, or can comprise well known devices in a general-purpose computer. Those devices have computer programs stored therein, which are selectively activated or reconstructed. Such computer programs can be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. In other words, the readable media comprise any media storing or transmitting information in a device (for example, computer) readable form.

It should be understood by those skilled in the art that computer program instructions can be used to realize each block in structure diagrams and/or block diagrams and/or flowcharts as well as a combination of blocks in the structure diagrams and/or block diagrams and/or flowcharts. It should be understood by those skilled in the art that these computer program instructions can be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

It may be understood by those skilled in the art that the steps, measures and solutions in the operations, methods and flows already discussed in the present invention may be alternated, changed, combined or deleted. Further, other steps, measures and solutions in the operations, methods and flows already discussed in the present invention can also be alternated, changed, rearranged, decomposed, combined or deleted. Further, the steps, measures and solutions of the prior art in the operations, methods and operations disclosed in the present invention can also be alternated, changed, rearranged, decomposed, combined or deleted.

The foregoing descriptions are merely some implementations of the present invention. It should be noted that, to a person of ordinary skill in the art, various improvements and modifications can be made without departing from the principle of the present invention, and these improvements and modifications shall be regarded as falling into the protection scope of the present invention.

The invention claimed is:

1. A method performed by a terminal for receiving paging information in a wireless communication system, the method comprising:
   receiving a configuration message by higher layer signaling;
   identifying a size of downlink control information (DCI) including at least one bit corresponding to respective paging indication information of at least one terminal based on the configuration message, the paging indication information indicating whether to monitor a physical downlink control channel (PDCCH) for receiving paging information;
   receiving the DCI;
   determining to monitor the PDCCH for receiving the paging information, in case that a bit value corresponding to the paging indication information for the terminal is a first value;
   determining not to monitor the PDCCH for receiving the paging information, in case that the bit value corresponding to the paging indication information for the terminal is a second value; and
   performing to monitor the PDCCH for receiving the paging information, in case that the bit value is the first value.

2. The method of claim 1, wherein the bit value corresponding to the paging indication information is "0" or "1".

3. The method of claim 1, further comprising:
   identifying offset information on a relative location in a time-domain between the paging indication information and an occasion for monitoring of the PDCCH based on the configuration message.

4. The method of claim 1, further comprising:
   receiving information for detecting the paging indication information;
   identifying that the paging indication information is not detected; and
   determining not to monitor the PDCCH for receiving the paging information.

5. The method of claim 1, wherein the performing further comprises:
   monitoring a paging occasion (PO) corresponding to a PDCCH monitoring occasion.

6. An apparatus for receiving paging information, in a wireless communication system, the apparatus comprising:
   a transceiver; and
   at least one processor configured to:
      receive, via the transceiver, a configuration message by higher layer signaling,
      identify a size of downlink control information (DCI) including at least one bit corresponding to respective paging indication information of at least one terminal based on the configuration message, the paging indication information indicating whether to monitor a physical downlink control channel (PDCCH) for receiving paging information,
      receive, via the transceiver, the DCI,
      determine to monitor the PDCCH for receiving the paging information, in case that a bit value corresponding to the paging indication information for the terminal is a first value,
      determine not to monitor the PDCCH for receiving the paging information, in case that the bit value corresponding to the paging indication information for the terminal is a second value, and perform to monitor the PDCCH for receiving the paging information, in case that the bit value is the first value.

7. The apparatus of claim 6, wherein the bit value corresponding to the paging indication information is "0" or "1".

8. The apparatus of claim 6, wherein the at least one processor is further configured to:
identify offset information on a relative location in a time-domain between the paging indication information and an occasion for monitoring of the PDCCH based on the configuration message.

9. The apparatus of claim 6, wherein the at least one processor is further configured to:
receive information for detecting of paging indication information;
identify that the paging indication information is not detected; and
determine not to monitor the PDCCH for receiving the paging information.

10. The apparatus of claim 6, wherein the at least one processor is further configured to:
monitor a paging occasion (PO) corresponding to a PDCCH monitoring occasion.

* * * * *